US012502896B2

(12) United States Patent
Ogle et al.

(10) Patent No.: US 12,502,896 B2
(45) Date of Patent: Dec. 23, 2025

(54) PRINTHEAD IDENTIFICATION SYSTEMS AND METHODS

(71) Applicant: ZEBRA TECHNOLOGIES CORPORATION, Lincolnshire, IL (US)

(72) Inventors: Stanley D. Ogle, Newbury Park, CA (US); William P. Schatz, West Hills, CA (US); David N. Ling, Lincolnshire, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 166 days.

(21) Appl. No.: 18/375,146

(22) Filed: Sep. 29, 2023

(65) Prior Publication Data

US 2025/0108628 A1 Apr. 3, 2025

(51) Int. Cl.

*B41J 2/355* (2006.01)
*B41J 2/36* (2006.01)
*B41J 5/46* (2006.01)

(52) U.S. Cl.

CPC ............... *B41J 2/3555* (2013.01); *B41J 2/36* (2013.01); *B41J 5/46* (2013.01)

(58) Field of Classification Search

CPC ............... B41J 2/3555; B41J 2/36; B41J 5/46
USPC ........................................................ 347/195
See application file for complete search history.

(56) References Cited

U.S. PATENT DOCUMENTS

2016/0159105 A1* 6/2016 Buxton ..................... B41J 2/36 347/211

* cited by examiner

*Primary Examiner* — Jason S Uhlenhake
*Assistant Examiner* — Alexander D Shenderov

(57) ABSTRACT

A method includes: storing, in a memory, a test command defining an array of effector element activation states; at a controller connected with the memory, transmitting the test command to an interface configured to connect the controller with an installed effector assembly from a plurality of possible effector assembles including at least a first effector assembly and a second effector assembly, the installed effector assembly being one of (i) the first effector assembly having a first array of effector elements, or (ii) the second effector assembly having a second array of effector elements; at the controller, detecting whether effector elements of the installed effector assembly are activated according to the test command; and at the controller, identifying the installed effector assembly as either the first effector assembly or the second effector assembly based on the detection.

12 Claims, 5 Drawing Sheets

240

| Test No. | Test Command | Positive | Negative |
|---|---|---|---|
| 1 | Data1: 00000000<br>Data2: 00110001 | ID 216-2 | Test 2 |
| 2 | 0101000000000000 | Test 3 | ID 216-4 |
| 3 | 0000000000001110 | ID 216-3 | ID 216-1 |

500-1
500-2
500-3

PRINTHEAD IDENTIFICATION SYSTEMS AND METHODS

BACKGROUND

Some systems can support a selection of array-based devices where the configuration of the systems can vary depending which of the array-based devices have been selected for use. For example, media processing devices such as printers may be compatible with multiple distinct printheads, each of which may involve the use of different configuration data for printing. Incorrect printhead identification may therefore negatively impact printer operation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
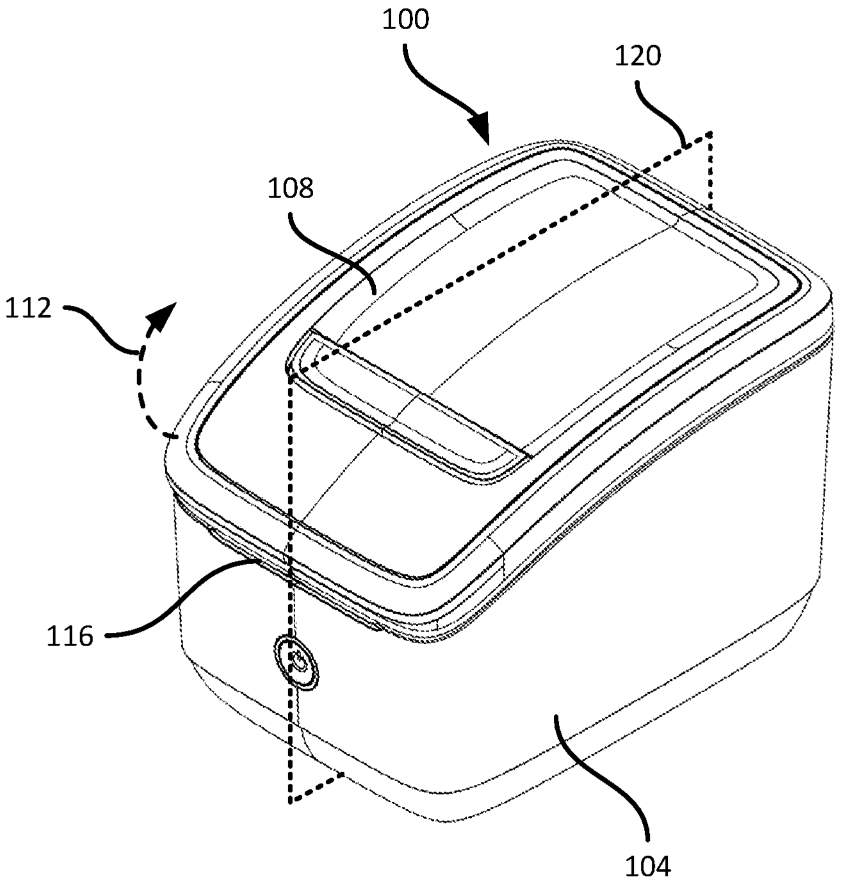
FIG. 1 is a diagram of a printer.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Examples disclosed herein are directed to a method, comprising: storing, in a memory, a test command defining an array of effector element activation states; at a controller connected with the memory, transmitting the test command to an interface configured to connect the controller with an installed effector assembly from a plurality of possible effector assembles including at least a first effector assembly and a second effector assembly, the installed effector assembly being one of (i) the first effector assembly having a first array of effector elements, or (ii) the second effector assembly having a second array of effector elements; at the controller, detecting whether effector elements of the installed effector assembly are activated according to the test command; and at the controller, identifying the installed effector assembly as either the first effector assembly or the second effector assembly based on the detection.

Additional examples disclosed herein are directed to a device, comprising: a memory storing a test command defining an array of effector element activation states; an interface configured to connect with an installed effector assembly from a plurality of possible effector assembles including at least a first effector assembly and a second effector assembly, the installed effector assembly being one of (i) the first effector assembly having a first array of effector elements, or (ii) the second effector assembly having a second array of effector elements; and a controller connected with the memory and the interface, the controller configured to: transmit the test command to the interface; detect whether effector elements of the installed effector assembly are activated according to the test command; and identify the installed effector assembly as either the first effector assembly or the second effector assembly based on the detection.

FIG. 1 illustrates an example device in the form of a media processing device 100, such as a label printer (also referred to herein as the printer 100). The printer 100 can be implemented as a desktop printer, as illustrated. The printer 100 can also be implemented in a wide variety of other form factors, including a mobile printer, tabletop printer, industrial printer, or the like. The printer 100 includes various components configured to apply indicia to media such as discrete labels, a continuous paper strip, identity cards, or the like. The indicia can be applied, for example, by direct thermal printing, thermal transfer printing, or the like. In other examples, the media processing device 100 can include a radio frequency identification (RFID) assembly configured to write data to RFID tags embedded in labels or other media, in addition to or instead of applying indicia to the media.

The printer 100 includes a body 104 housing a media supply, a printhead, and other components, as well as a cover or door 108 configured to open (e.g., in a direction 112) to provide access to an interior of the printer 100. The printer 100 further includes an outlet 116, from which processed media (e.g., labels with indicia having been applied thereto within the body 104 of the printer 100) is dispensed.

Figure 2:
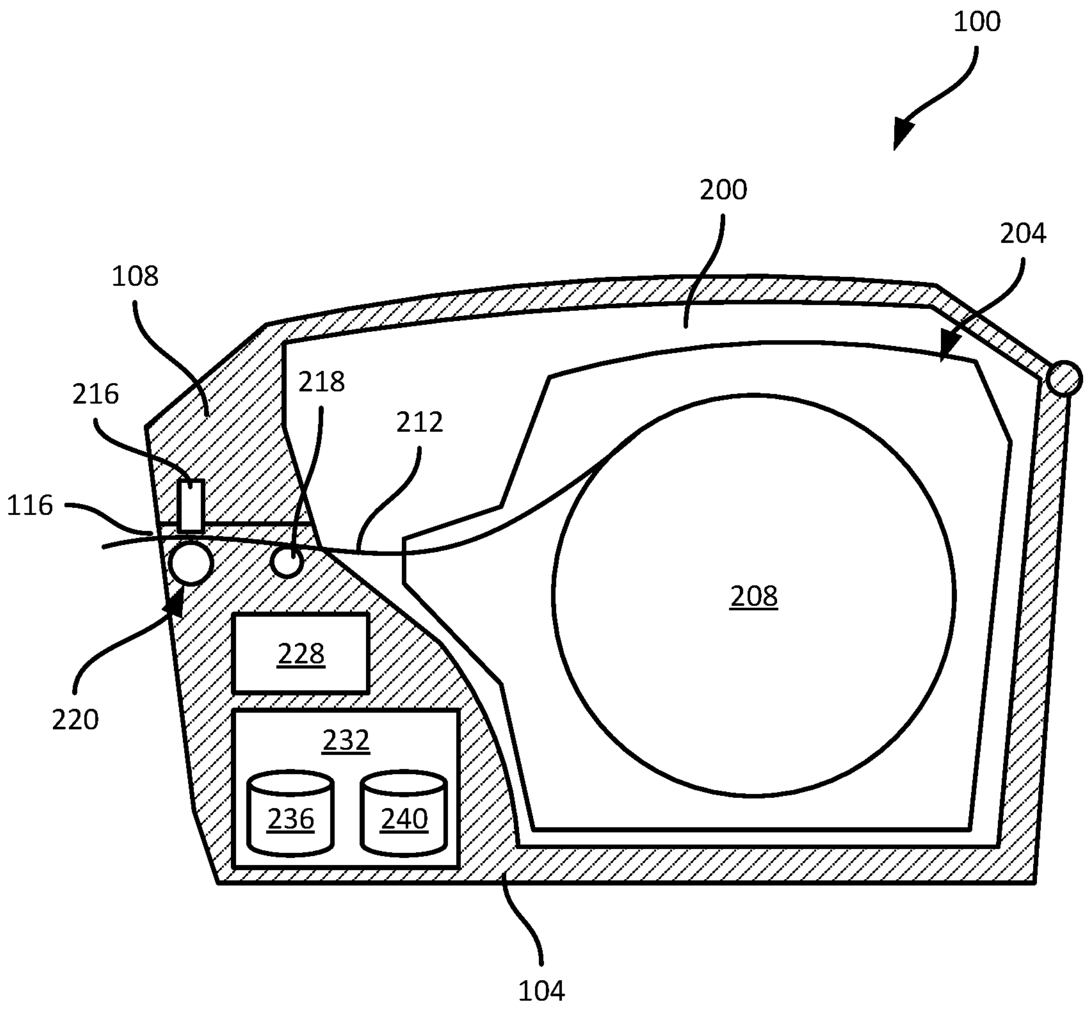
FIG. 2 is simplified cross section of the printer of FIG. 1, illustrating certain internal components of the printer.

FIG. 2 illustrates a simplified cross sectional view of the printer 100, taken at the plane 120 shown in FIG. 1. As seen in FIG. 2, the body 104 and the cover 108 define a chamber 200 for receiving one or more media supplies, such as a media cartridge 204 (also referred to herein as a supply 204) containing a roll 208 of paper, labels, or the like. In other examples, the media supplies accommodated in the chamber 200 can include boxes of fan-feed labels, identity cards, or the like. In still other examples, the printer 100 can include an inlet in the body 104 for receiving media from an external supply, e.g., to travel through the chamber 200 for processing.

Media 212 from the supply 204 (e.g., from the roll 208, in the illustrated example) travels along a media path from the supply 204 to a nip formed by a printhead 216 and a platen roller 220. The media path can be defined by surfaces, rollers, and the like, such as a guide roller 218 (e.g., a passive, or non-driven, roller). The platen roller 220 can be driven, e.g., to pull the media 212 along the media path and through the nip, where the printhead 216 applies indicia to the media 212. The processed media (e.g., bearing indicia applied by the printhead 216) is then dispensed at the outlet 116.

The indicia applied to the media 212 by the printhead 216 can be provided to the printhead 216 by a controller 228 contained within the body 104 of the printer 100. The controller 228 can, for example, receive print data defining text, images, or the like to be applied to the media 212 from a host computing device (e.g., a desktop computer, a smartphone, server, or the like) via a communications interface connected with the controller 228 and supported within the body 104. The controller 228 can be configured, in response to receiving the print data, to control the printhead 216 to apply indicia corresponding to the print data to the media 212. As discussed in greater detail below, the printhead 216, which can also be referred to as an effector assembly, includes an array of effector elements, such as discrete thermal elements also referred to as dots. The array, for example, can be a linear array extending across the media path along which the media 212 travels. The effector elements can be individually activated to apply heat to corresponding portions of the media 212. As will be understood, for direct thermal printers, as shown in FIG. 2, application of heat to a portion of the media 212 may activate a thermochromic pigment in the media 212. For thermal transfer printers, a ribbon can traverse the nip with the media 212, and application of heat to a portion of the media 212 and the ribbon can cause the transfer of pigment from the ribbon to the media 212.

To control the printhead 216 to apply indicia to the media 212, the controller 228 can transmit a sequence of commands to the printhead 216, each defining one line of activation states for the dots of the printhead 216. The activation states can be binary states, indicating whether each dot is to be activated (e.g., energized to produce heat which can be used to print to the media 212 in a corresponding region such that the corresponding regions has a pigment) or to remain inactive (e.g., de-energized such that no heat is produced and a corresponding region of the media 212 remains unpigmented).

The printer 100 may accommodate any one of various different printheads 216. For example, a plurality of manufacturers may provide printheads 216 compatible with the printer 100. Different printheads 216 may provide different print resolutions (e.g., in dots per inch), section lengths, support different print speeds, media types, or the like. The various printheads 216 that are compatible with the printer 100 may have varying numbers of effector elements, and varying addressing mechanisms for their effector elements. The controller 228 can be coupled to or integrated with a memory 232 that stores configuration data 236 defining settings for each printhead 216 that is compatible with the printer 100. The configuration data 236 can be a component of a firmware application stored in the memory 232, for example. The configuration data 236 can include printhead identifiers and, for each printhead identifier 216, data defining printhead attributes such as a number of dots, an addressing syntax for the dots, section length, and the like.

The printer 100 includes an interface between the controller 228 and the printhead 216, such as a connector and associated circuitry permitting the controller 228 to send print commands to the printhead 216. The connector may, however, lack a port, line, or the like, to receive data explicitly identifying the printhead 216. In the absence of a printhead identifier, because the printer 100 can accommodate any one of several different printheads 216, retrieving the appropriate record(s) from the configuration data 236 may not be possible. Using configuration data that does not correspond to the installed printhead 216 can negatively impact print quality. As discussed below, the printer 100 therefore implements certain functionality to identify printheads 216 using one or more test commands, e.g., stored in a test command repository 240. By transmitting the test commands to the printhead 216 in a predefined order, and monitoring the outcome of each test command, the controller 228 can determine which specific printhead 216 is installed, and then load the appropriate record(s) from the configuration data 236.

Figure 3A:
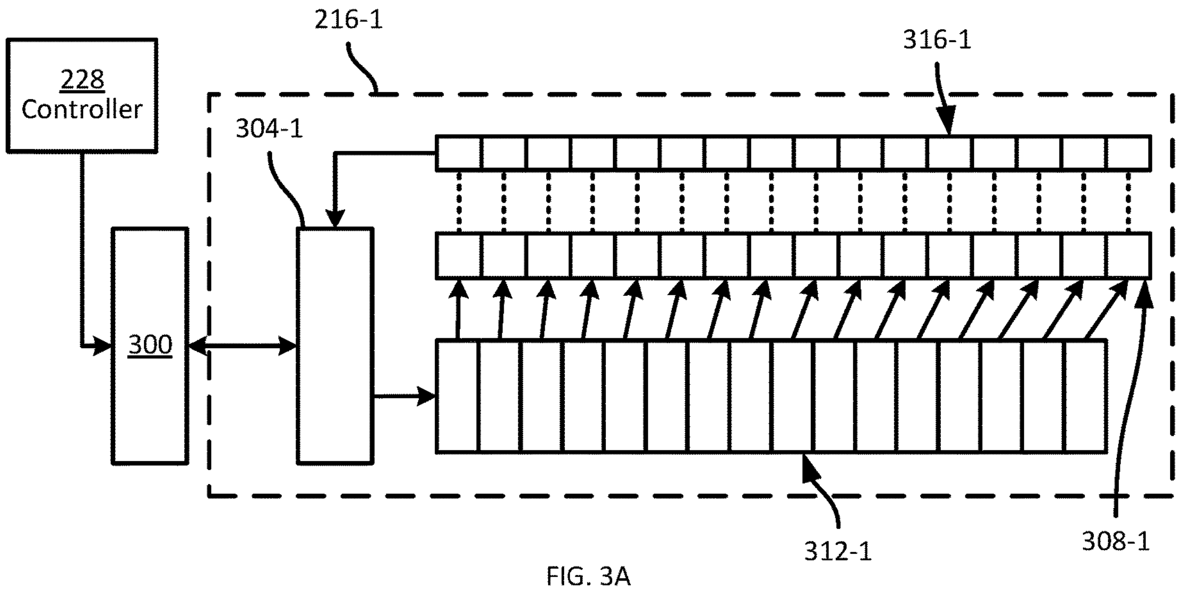
FIG. 3A is a diagram of a printhead of the printer of FIG. 1.

Turning to FIG. 3A, a schematic diagram of an example printhead 216-1 that may be installed in the printer 100 is shown. The controller 228 is also shown, along with an interface 300 of the printer 100 configured to connect the controller 228 with the printhead 216-1. The interface 300 can include a physical connector, e.g., with a plurality of pins or other structures configured to engage with corresponding structures of a printhead interface 304-1 of the printhead 216-1.

The printhead interface 304-1 includes a data port configured to receive commands from the controller 228 defining activation states for each of an array of effector elements 308-1. Each command can include, for example, a string of bits defining, for each effector element in the array 308-1, whether that element is to be activated or not. For example, a value of "1" in the command causes activation of a corresponding dot to apply heat to the media 212, while a value of "0" causes the corresponding dot to remain inactive (no heat is applied).

The printhead 216-1 further includes a buffer or other memory 312-1 (e.g., a shift register in this example). In this example, each illustrated portion of the memory 312-1 stores one bit of a command received from the controller 228. As shown by the arrows between the memory 312-1 and the array 308-1, each bit in the memory 312-1 corresponds to one dot in the array 308-1. The printhead 216-1 is a single-section printhead, in that the memory 312-1 receives, from the controller 228, activation state data for each dot in the array 308-1. Some printheads, as discussed below, are multiple-section printheads (e.g., dual-section printheads) that include two distinct memories, with distinct inputs from the controller 228. In such printheads, each section addresses a distinct portion of the dots in the corresponding array 308. In this example, the printhead 216-1 includes sixteen dots in the array 308-1, and sixteen bits in the memory 312-1. Printheads can include effector element arrays of a wide variety of sizes, however. For example, a printer configured to process four-inch wide labels may accept printheads with arrays of about eight hundred dots (e.g., for a resolution of about two hundred dots per inch).

The printhead 216-1 can also include strobe elements and associated circuitry (not shown), and the interfaces 300 and 304-1 can include corresponding ports for activating such strobe elements. The controller 228 can therefore provide a command to the printhead 216-1 for storage in the memory 312-1, and then cause the activation of the strobe elements, such that any dots in the array 308-1 for which a corresponding bit in the memory 312-1 is set to "1" are activated, while the remaining dots remain inactive. The memory 312-1 can then be cleared, and the next command can be received from the controller 228.

The printhead 216-1 can also include a test assembly 316-1. For example, the test assembly can include resistors connected to each dot in the array 308-1 and to the interface 304-1 (e.g., to an output port on the interface 304-1). The controller 228 can be configured to send test commands to the printhead 216-1. The test commands can contain an array of activation states as described above in connection with print commands. The controller 228 can also be configured to operate the printhead 216-1 in a test state, or to cause a local controller of the printhead 216-1 to operate in the test mode. In the test mode, for example, the dots of the array 308-1 may be supplied with a smaller level of current than in a printing mode, and the resistors 316-1 can be connected to the array 308-1. In response to activation of one or more dots in the array 308-1, the controller 228 can therefore detect (via the resistors 316-1 and the interfaces 304-1 and 300) current flow indicating that a dot activated in test mode is operational. If no current is detected, the dot may be non-functional, e.g., due to physical damage.

In some printers, the above-mentioned test mode is used to test the dots of the array 308-1 one at a time, e.g., via a series of test commands each with a single bit activated. The printer 100, in addition to performing such per-dot testing, can also employ the test mode to identify the printhead 216-1 among a plurality of printheads 216 that are compatible with the printer 100.

Figure 3B:
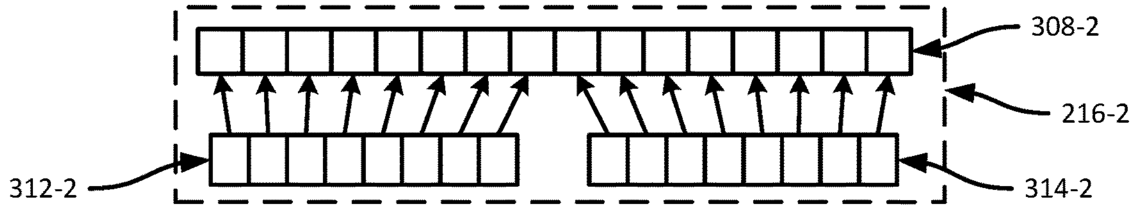
FIG. 3B is a diagram of another printheads compatible with the printer of FIG. 1.
Figure 3C:
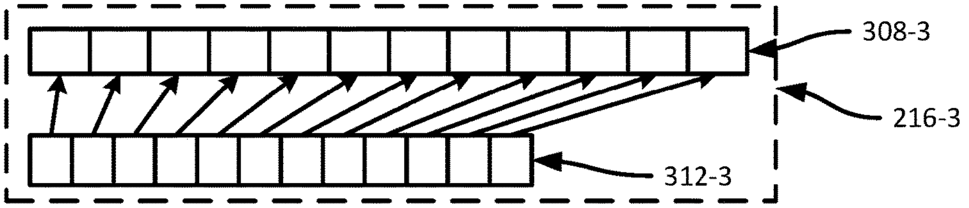
FIG. 3C is a diagram of a further printhead compatible with the printer of FIG. 1.
Figure 3D:
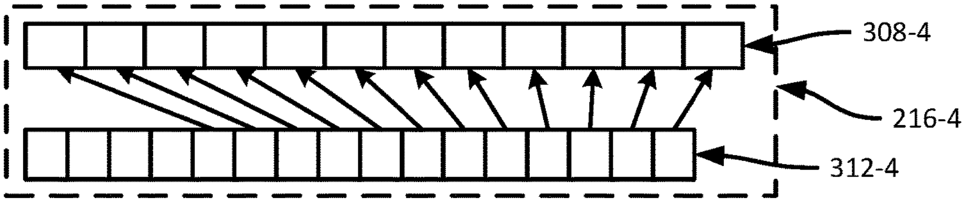
FIG. 3D is a diagram of an additional printhead compatible with the printer of FIG. 1.

FIG. 3B-D illustrate simplified diagrams for three other printheads 216-2, 216-3, and 216-4, respectively, that are compatible with the printer 100. The diagrams of FIG. 3B-D omit interfaces 304 and test assemblies 316 for simplicity, but it will be understood that each of the printheads 216 includes an interface 304 and a test assembly 316.

The printhead 216-2 has a sixteen-dot array 308-2, and a dual-section memory, implemented as a first memory section 312-2 and a second memory section 314-2, each having eight bits of storage. The dual-section memory of the printhead 216-2 can be addressed separately by the controller 228. That is, the controller 228 can transmit two commands substantially simultaneously to the printhead 216-2, e.g., via separate interface ports, with one command destined for the memory 312-2, and the other command destined for the memory 314-2. The sections 312-2 and 314-2 need not have equal lengths, in other examples. For instance, some dual-section printheads may have a first memory section addressing seven dots of a sixteen-dot array, and a second memory section addressing the remaining nine dots of a sixteen-dot array. More generally, the total storage capacity (e.g., in number of bits) of the memory sections of a printhead 216 matches or exceeds the total number of dots in the printhead's effector array 308, while the division of the storage capacity between multiple sections can be equal or unequal.

The printhead 216-3 has a twelve-dot array 308-3, and a twelve-bit memory 312-3. The printhead 216-4 has a twelve-dot array 308-4, and a sixteen-bit memory 312-4, in which the first four bits do not correspond to any dots in the array 308-4. For example, the memory 312-4 may be implemented by a set of integrated circuits with a total storage of sixteen bits, such that four bits are not needed and therefore not allocated to dots in the array 308-4. As will be understood from FIG. 3A and FIGS. 3B-D, the sizes of the arrays 308 and memories 312 can vary between printheads 216, as can the alignment between the memories 312 and corresponding arrays 308. Controlling a given printhead 216 to apply a line of pigment on the media 212 may therefore involve generating a different command (e.g., of a different length, and/or with bits for a given portion of the media 212 positioned differently in the command) at the controller 228. The configuration data 236 permits the controller 228 to generate commands aligned with the attributes of each of the printheads 216. As will be discussed below, the controller 228 also makes use of the testing assemblies 316 of each printhead 216 to identify which of the printheads 216 is currently installed in the printer 100.

Figure 4:
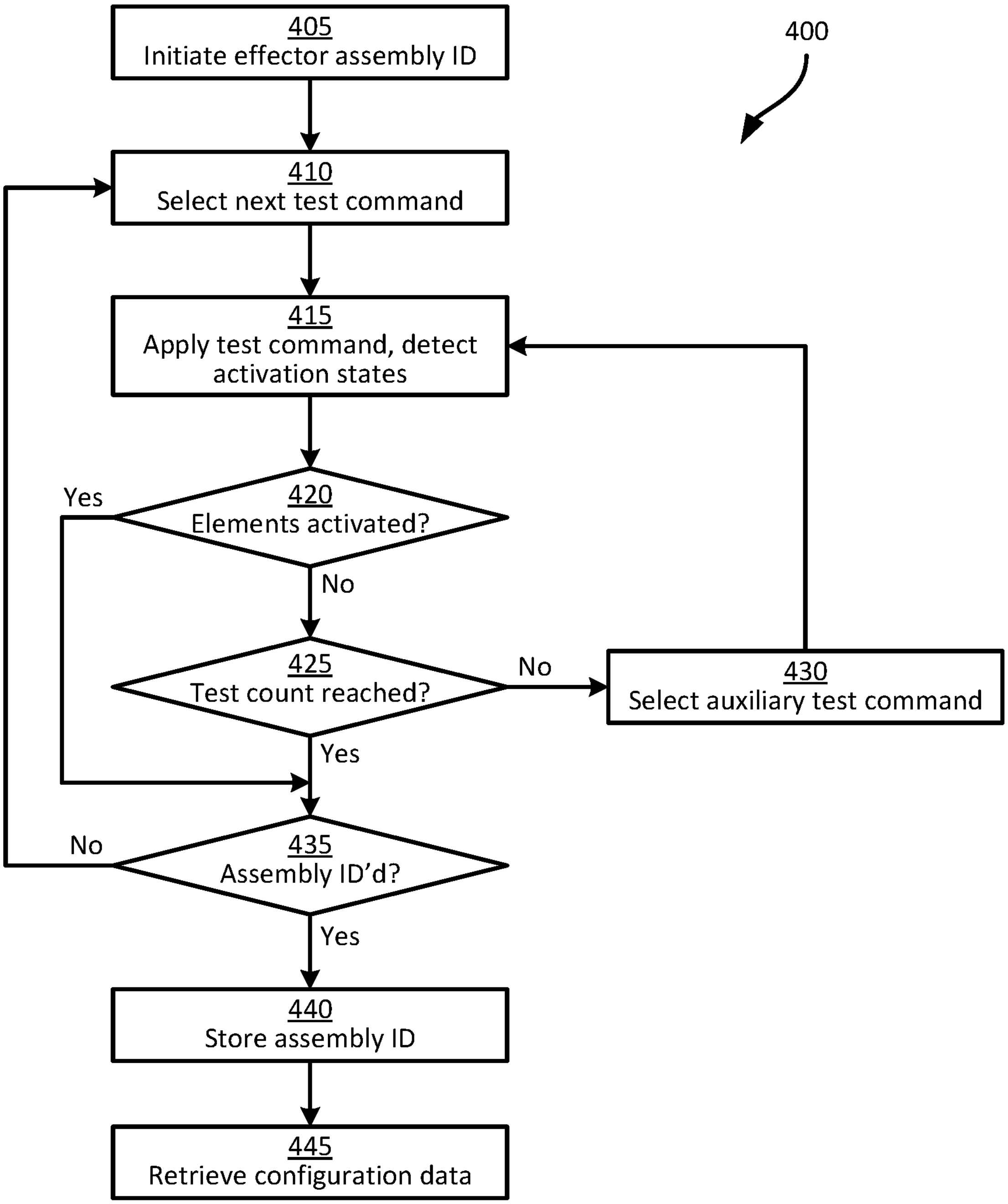
FIG. 4 is a flowchart of a method of effector assembly identification.

Turning to FIG. 4, a method 400 of effector assembly identification is illustrated. The method 400 is described below in conjunction with its example performance in the printer 100 by the controller 228. The controller 228 can perform the method 400 via execution of computer-readable instructions stored in the memory 232 defining a firmware application or the like. While an example embodiment is illustrated using a printer and printhead, as will be understood by those skilled in the art, the method 400 can also be performed in other devices to identify other effector assemblies than printheads.

At block 405, the controller 228 is configured to initiate the effector assembly identification process. The controller 228 can be configured to automatically perform block 405 each time the printer 100 is powered on in some examples. In other examples, the controller 228 can perform block 405 in response to an explicit command, e.g., from a host computing device, a user interface of the printer 100, or the like. In further examples, the controller 228 can perform block 405 in response to either power-up or such a command.

At block 410, the controller 228 is configured to select a test command from the repository 240. The repository 240 can store one or more sequences of predetermined test commands, each containing a set of activation states for the effector elements of the installed effector assembly (e.g., high or low values for the dots of the currently installed printhead 216). The test commands, as discussed below, are arranged in sequence to identify a specific printhead 216, in some cases using a process of elimination by initially identifying a subset of possible printheads with one or more test commands while excluding others, and then identifying a specific printhead 216 with one or more further test commands.

Figures 5A, 5B:
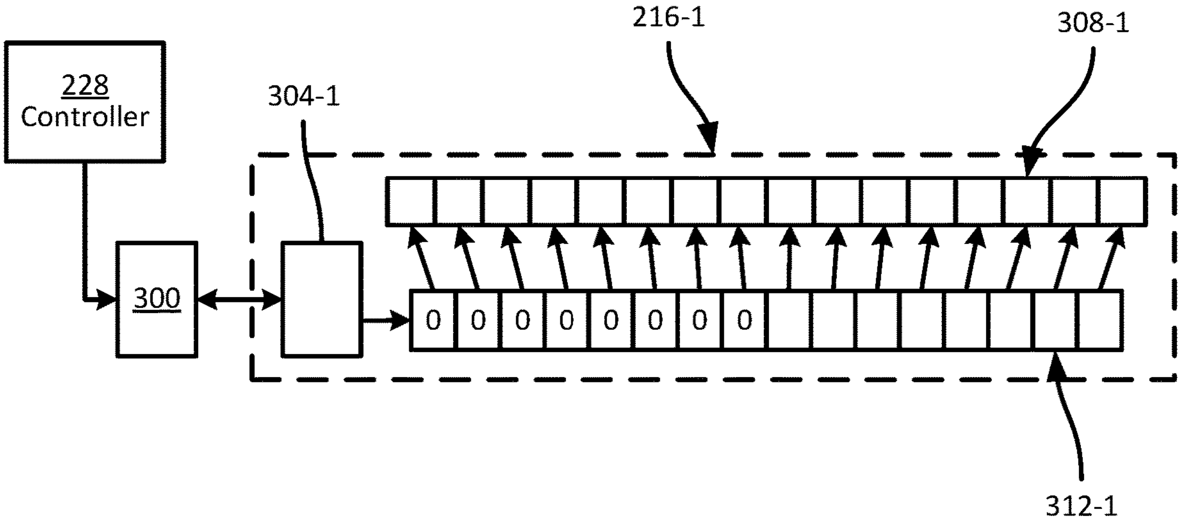
FIG. 5A is a diagram of example test commands in the printer of FIG. 1.
FIG. 5B is a diagram illustrating an example performance of block 415 of the method of FIG. 4.

An example test command repository 240 is shown in FIG. 5A, in the form of a table including records 500-1, 500-2, and 500-3 defining distinct test commands. The test commands can be stored in a wide variety of other formats than those shown, and it will be understood that the tabular format shown in FIG. 5A is provided for illustrative purposes. As discussed below, the test commands reflect that each of the printheads 216 that may be installed in the printer 100 have at least one memory section 312, 314, that is a different size than the same memory section of each of the other printheads that may be installed in the printer 100.

The records 500 in the repository 240 are arranged in a hierarchical order, e.g., via test numbers or other identifiers, and instructions corresponding to negative and positive results for the corresponding test. The controller 228 is configured, for each performance of the method 400, to begin with the record 500-1, marked as the first test (e.g., with the test number "1").

At block 415, the controller 228 is configured to apply the test command selected at block 410, and to detect the activation states of the effector elements in the array 308 of the installed effector assembly (e.g., whichever of the printheads 216 is installed in the printer 100). To apply the test command, the controller 228 can transmit the test command to a corresponding data port of the interface 300, for transmission to the interface 304 of the installed printhead 216 and storage in the corresponding memory 312. Detecting the resulting activation states can include, at the controller 228, receiving a signal or set of signals from the test assembly 316 of the installed printhead 216 indicating whether any dots of the printhead 216 were activated in response to the test command. In some examples, the signal(s) from the test assembly 316 may indicate which specific dots in the array 308 were activated, and/or may indicate a measured current level from the activated dots.

At block 420, the controller 228 is configured to determine whether the outcome of the test command applied at block 415 is positive (indicating effector elements were activated or indicating expected effector elements were activated) or negative (indicating no effector elements were activated or indicated expected effector elements were not activated). Referring again to FIG. 5A, the first test command record 500-1 includes two distinct strings of activation states, corresponding to two distinct data ports of the interface 300. The test command defined by the record 500-1, in other words, is configured for a dual-section printhead 216, such as the printhead 216-2. Single-section printheads 216, such as the printheads 216-1, 216-3, and 216-4, may have only one data port, and such may therefore receive the "Data1" string (which consists of eight zeroes in this example, e.g., corresponding to the dots remaining in an inactive state), but may not receive the "Data2" string (which includes ones for activating dots).

As shown in FIG. 5B, if the printhead 216-1 is the currently installed printhead, transmission of the test command defined by the record 500-1 via the interface 300 may result in the "Data1" string being written to the memory 312-1, and the "Data2" string being discarded because the interface 304-1 lacks a second data port. The remaining eight bits of the memory 312-1 are shown as remaining empty, which may be equivalent to storing zeroes. The test command therefore does not result in the activation of any elements in the array 308-1.

Returning to FIG. 4, the determination at block 420 is therefore negative in this example. The controller 228 is configured to select the next test command from the repository 240 according to whether the current test command resulted in a positive or negative detection. In some examples, however, negative detection results may arise due to damaged dots, rather than due to a misalignment between the test command and the array 308. The controller 228 can therefore implement an auxiliary test command process at blocks 425 and 430 before proceeding to the next test command.

At block 425, the controller 228 can be configured to determine whether a test count threshold for the current test command has been reached. When the determination at block 425 is negative, the controller 228 proceeds to block 430, and selects an auxiliary test command. The auxiliary test command can be defined in the same record 500 as selected at block 410. For example, in other implementations the record 500-1 can include one or more auxiliary test commands, e.g., in which the "Data2" string differs from the string shown in FIG. 5A. The auxiliary test commands serve to test a different subset of elements in the same range as the primary test command of the same record, in the event that the elements targeted by the primary test command are damaged (which could lead to a false negative detection result). The "Data2" string of an example auxiliary test command can be, for example, the string "11000110".

Having selected an auxiliary test command at block 430, the controller 228 is configured to apply that test command at block 415, as described above, and to repeat the determination at block 420. If the determination at block 420 remains negative, the controller 228 can repeat blocks 430 and 415 until the test count threshold (e.g., three, although a wide variety of other thresholds can also be used) is reached at block 425. When the determination at block 425 is affirmative, the controller 228 proceeds to block 435. As will now be understood, the performance of blocks 420, 425, and 430 can be used to confirm that a negative detection result indicates, e.g., that there are no effector elements corresponding to those targeted by the test command, rather than effector elements being present but damaged.

In other examples, blocks 420, 425, and 430 can be omitted, and the controller 228 can proceed directly to determining whether the effector assembly has been fully identified at block 435, following a performance of block 415. At block 435, the controller 228 is configured to determine whether the installed printhead 216 has been fully identified. The determination at block 435 is made based on the repository 240. Turning to FIG. 5, each record 500 defines a positive and negative outcome. Certain outcomes indicate identifiers of specific printheads 216. Other outcomes indicate a further test command to select for use at another performance of block 415. The record 500-1, in this example, indicates that a positive detection result indicates that the printhead 216-2 is installed. The determination at block 435 would therefore be affirmative. In this example, however, the detection result for the initial test command was negative, and the record 500-1 indicates that the controller 228 is therefore to proceed to the next test command.

As will be understood, a negative detection result from the initial test command indicates that the installed printhead 216 is not a dual-section printhead 216, but does not distinguish between the three possible single-section printheads 216. The installed printhead 216 has, in other words, been identified as being a member of a certain subset of the possible printheads 216, but not specifically identified. The identification of the installed printhead 216 is therefore not yet complete, and the determination at block 345 is negative.

Following a negative determination at block 435, the controller 228 is configured to return to block 410 and select the next test command, according to the negative outcome indicator of the record 500-1 in this example. The controller 228 therefore selects the test command defined by the record 500-2, and transmits the string "0101000000000000" to the interface 300. The string includes sixteen bits, the second and fourth of which cause activation of a dot, if a corresponding dot exists. As will be understood, the printheads 216-1 and 216-3 have dots corresponding to the second and fourth bits of a command, but the printhead 216-4 does not. The determination at block 420 is affirmative in this example, and the controller 228 therefore proceeds to block 435. According to the record 500-2, printhead identification is not yet complete, because a positive detection result leads to the third test record 500-3. As also shown in FIG. 5A, a negative detection result for the second test command would specifically identify the printhead 216-4 (being the only one of the four available printheads 216 with no dots corresponding to the first four bits of the memory 312-4).

The second determination at block 435 is therefore also negative, and the controller 228 returns to block 410 to select the third test record 500-3 and repeat block 415. As will be apparent, transmission of the string "0000000000001110" (sixteen bits, with three of the final four set to an active state) to the interface 300 permits the controller 228 to distinguish between the printheads 216-1 and 216-3, because the printhead 216-3 does not have memory to store the final four bits of the command, or corresponding dots. The determination at block 420 is therefore affirmative, and the determination at block 435 is also affirmative, because the record 500-3 indicates that a positive detection result corresponds to the printhead identifier 216-3.

At block 440, the controller 228 can store the printhead identifier obtained via the method 400 in the memory 232, e.g., in a registry allocated to printhead identification. Storage of the printhead identifier can enable retrieval of the identifier by a host computing device, for example. The controller 228 is also configured, at block 445, to retrieve configuration data for the printhead 216-3 from the repository of configuration data 236. The printer 100 can then receive and execute print jobs.

It will be understood from the examples above that sequences of test commands can be prepared and stored in the memory 232 to identify any of a wide variety of printheads 216, by selecting test commands that distinguish certain subsets of the available printheads 216, or specific printheads 216. Test commands can be prepared, for example, that distinguish between printheads 216 with longer or shorter shift registers, with unassigned bits (e.g., that do not correspond to dots) in their shift registers, and the like.

In some examples, the signal(s) returned from the test assemblies 316 indicate not only the presence or absence of current, but the level of current measured. The determination at block 420 (and more generally, the determination of whether the detection result is negative or positive) can be performed by comparing the measured current to a threshold, with the determination being negative if the current level is below a threshold. In other examples, such current measurements can also be used to distinguish between printheads 216 with similar or identical array 308 and memory 312 configurations. For example, a record 500 of the repository 240 may indicate that measured current above a first threshold corresponds to one printhead 216, while measured current above a second, higher, threshold corresponds to another printhead 216.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

storing, in a memory, a plurality of test commands, each test command defining a different pattern of effector element activation states;

at a controller connected with the memory, transmitting a first test command of the plurality of test commands to an interface configured to connect the controller with an installed effector assembly from a plurality of possible effector assembles including at least a first effector assembly and a second effector assembly, the installed effector assembly being one of (i) the first effector assembly having a first array of effector elements, or (ii) the second effector assembly having a second array of effector elements, the first test command has a first pattern of effector element activation states configured to activate a first plurality of effector elements;

transmitting a second test command of the plurality of test commands to an interface configured to connect the controller with an installed effector assembly from the plurality of possible effector assemblies, the second test command has a second pattern of effector element activation states configured to activate a second plurality of effector elements;

at the controller, detecting whether effector elements of the installed effector assembly are activated according to the first pattern of the first test command or the second pattern of the second test command; and at the controller, identifying the installed effector assembly as either the first effector assembly or the second effector assembly based on the detection.

2. The method of claim 1, further comprising:

storing, in the memory, (i) a first identifier corresponding to the first effector assembly having the first array of effector elements, and (ii) a second identifier corresponding to the second effector assembly having the second array of effector elements;

wherein identifying the installed effector assembly includes selecting the first identifier or the second identifier.

3. The method of claim 2, further comprising:

in response to selecting one of the first identifier or the second identifier, retrieving configuration data corresponding to the selected identifier; and controlling the installed effector assembly according to the configuration data.

4. The method of claim 2, further comprising:

storing, in the memory, an association between the first identifier and detection that effector elements of the installed effector assembly are activated in response to at least one of the plurality of the test commands; and storing, in the memory, an association between the second identifier and detection that effector elements of the installed effector assembly are not activated in response to at least one of the plurality of the test commands.

5. The method of claim 1, wherein the plurality of possible effector assemblies includes a third effector assembly having a third array of effector elements, and the method further comprising:

in response to detecting whether effector elements of the installed effector assembly are activated according to the first test command, determining that the installed effector assembly is a member of a subset of the plurality of possible effector assemblies including the first and second effector assemblies and excluding the third effector assembly.

6. The method of claim 1, wherein the first and second effector assemblies are thermal printheads;

wherein the arrays of effector elements are arrays of thermal dots; and wherein the test command defines a string of binary activation states for the thermal dots.

7. A device, comprising:

a memory storing a plurality of test commands, each test command defining a different pattern of effector element activation states;

an interface configured to connect with an installed effector assembly from a plurality of possible effector assembles including at least a first effector assembly and a second effector assembly, the installed effector assembly being one of (i) the first effector assembly having a first array of effector elements, or (ii) the second effector assembly having a second array of effector elements; and a controller connected with the memory and the interface, the controller configured to:

transmit a first test command of the plurality of test commands to the interface, the first test command has a first pattern of effector element activation states configured to activate a first plurality of effector elements;

detect whether effector elements of the installed effector assembly are activated according to the first pattern of the first test command;

transmit a second test command of the plurality of test to the interface, the second test command has a second pattern of effector element activation states configured to activate a second plurality of effector elements;

detect whether effector elements of the installed effector assembly are activated according to the second pattern of the second test command; and identify the installed effector assembly as either the first effector assembly or the second effector assembly based on the detection in response to the first and second test commands.

8. The device of claim 7, wherein the memory further stores (i) a first identifier corresponding to the first effector assembly having the first array of effector elements, and (ii) a second identifier corresponding to the second effector assembly having the second array of effector elements; and wherein the controller is configured to identify the installed effector assembly by selecting the first identifier or the second identifier.

9. The device of claim 8, wherein the controller is further configured to:

in response to selecting one of the first identifier or the second identifier, retrieve configuration data corresponding to the selected identifier; and control the installed effector assembly according to the configuration data.

10. The device of claim 8, wherein the memory further stores:

an association between the first identifier and detection that effector elements of the installed effector assembly are activated in response to at least a plurality of the test command; and an association between the second identifier and detection that effector elements of the installed effector assembly are not activated in response to at least a plurality of the test command.

11. The device of claim 7, wherein the plurality of possible effector assemblies includes a third effector assembly having a third array of effector elements;

and in response to detecting whether effector elements of the installed effector assembly are activated according to the first test command, determine that the installed effector assembly is a member of a subset of the plurality of possible effector assemblies including the first and second effector assemblies and excluding the third effector assembly.

12. The device of claim 7, wherein the first and second effector assemblies are thermal printheads;

wherein the arrays of effector elements are arrays of thermal dots; and wherein the test command defines a string of binary activation states for the thermal dots.

* * * * *